(12) United States Patent
Zhang

(10) Patent No.: US 7,574,136 B1
(45) Date of Patent: Aug. 11, 2009

(54) WAVELENGTH REAL TIME DISPLAY ON THE EQUIPMENT FOR WDM OPTICAL NETWORKING SYSTEMS WITH WAVELENGTH TUNABLE CAPABILITY

(75) Inventor: Guodong Zhang, Manalapan, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 481 days.

(21) Appl. No.: 11/322,069

(22) Filed: Dec. 29, 2005

(51) Int. Cl.
*H04J 14/02* (2006.01)
(52) U.S. Cl. .............................. 398/79; 398/95; 398/82
(58) Field of Classification Search .................. 398/79, 398/82, 135, 138, 9, 25, 33, 90, 95, 93, 43, 398/42, 34; 359/618
See application file for complete search history.

(56) References Cited

U.S. PATENT DOCUMENTS 7,366,370 B2 * 4/2008 Goodwill et al. .............. 385/24

| | | | |
|---|---|---|---|
| 2002/0126339 A1 * | 9/2002 | Sato et al. | 359/110 |
| 2003/0035615 A1 * | 2/2003 | Foltzer | 385/24 |
| 2003/0081284 A1 * | 5/2003 | Maki et al. | 359/124 |
| 2004/0105677 A1 * | 6/2004 | Hamada | 398/79 |
| 2005/0129402 A1 * | 6/2005 | Kim et al. | 398/79 |
| 2005/0213979 A1 * | 9/2005 | Nakashima et al. | 398/79 |

\* cited by examiner

*Primary Examiner*—M. R. Sedighian

(57) ABSTRACT

A wavelength tunable device for use in a wavelength division multiplexing (WDM) system comprising a display device for displaying at least one operating wavelength of the wavelength tunable device. The display device is electrically coupled to a control unit in the wavelength tunable device so as to display the tuned wavelength in real time. The wavelength tunable device may be, in exemplary embodiments, an optical transponder, wavelength division demultiplexer, or wavelength division multiplexer. In embodiments where the optical equipment has a plurality of tunable ports, the display device is adapted to display the operating wavelength of each tunable port.

4 Claims, 5 Drawing Sheets

WAVELENGTH REAL TIME DISPLAY ON THE EQUIPMENT FOR WDM OPTICAL NETWORKING SYSTEMS WITH WAVELENGTH TUNABLE CAPABILITY

BACKGROUND OF THE INVENTION

The present invention relates generally to optical networking, and more particularly, to a device for displaying the operating wavelength of wavelength tunable equipment in real time on the equipment.

In a traditional wavelength division multiplexing (WDM) system having transponders operating at a fixed wavelength, such wavelength is set during the manufacturing process. Within the WDM system, each transponder operates at a unique wavelength and, in terms of hardware and software, differs from other transponders operating at diverse wavelengths. For operational and maintenance purposes, the wavelength is usually printed or marked on the faceplate of each transponder. As wavelength tunable technologies are maturing, tunable transponders and other optical devices are starting to be deployed in WDM optical networks. In this regard, the wavelength of these transponders and other devices can be dynamically tuned as needed during operation. Within a WDM system, tunable transponders are physically the same, irrespective of the operating wavelength. Although each has the same hardware and software, the only difference between these transponders is that each is tuned to a unique wavelength during operation. The particular wavelength associated with each transponder can only be read from the craft interface terminal (CIT) and/or element management system (EMS), but cannot be readily identified directly from the equipment since all the transponders are structurally identical and look the same on the equipment. Consequently, operational personnel cannot ascertain the wavelength of each transponder by simply looking at the transponder, or without access to a CIT and/or EMS. For troubleshooting and other maintenance activities, it is a quite difficult and time-consuming task for operational personnel to identify a specific transponder among many such units. Moreover, there is a potential risk for traffic interruption if the personnel perform maintenance on the wrong transponder. On the other hand, it is undesirable to label (via printing or marking) the wavelength on each piece of equipment, particularly in the case of tunable WDM equipment, where the wavelength of a unit can be dynamically tuned during operation. It is not cost effective and a waste of resources to re-label the wavelength on such equipment every time the operating wavelength is changed to suit a particular application.

SUMMARY OF INVENTION

In accordance with an aspect of the present invention, it is an object thereof to display the operating wavelength of tunable optical equipment in a WDM optical network in real time.

It is a further object of the present invention to electronically display the operating wavelength of a tunable optical transponder for use in a WDM optical network in real time.

It is still another object of the present invention to provide maintenance personnel with a means of identifying the operating wavelength of tunable optical equipment in a WDM optical network without the need to access a CIT or EMS to obtain selected wavelength information.

It is yet another object of the present invention to provide a liquid crystal display (LCD), light emitting diode (LED) or like device, on the faceplate of tunable optical equipment in a WDM optical network, to enable more efficient maintenance and prevent a risk of traffic interruption caused by failure to identify the equipment properly.

In accordance with an aspect of the invention, a wavelength tunable device for use in a wavelength division multiplexing (WDM) system comprises a display device for displaying at least one operating wavelength of the wavelength tunable device. The display device is electrically coupled to a control unit disposed in or otherwise associated with the wavelength tunable device so as to display the tuned wavelength in real time. In an exemplary embodiment, the wavelength tunable device is an optical transponder, which comprises a line transmitter and a line receiver, where the line transmitter and line receiver may each be dynamically tuned to a selected wavelength.

In another embodiment, the wavelength tunable device is a wavelength division demultiplexer constructed and arranged for receiving an input multiplexed optical signal and comprising a plurality of tunable ports that output optical signals at specific wavelengths, where the display device is coupled to a control unit and adapted to display the wavelength of each of the plurality of tunable ports. Similarly, the wavelength tunable device can be a wavelength division multiplexer comprising a plurality of tunable ports for receiving individual optical signals at specific wavelengths, where the wavelength division multiplexer constructed and arranged for outputting a multiplexed optical signal, and the display device is coupled to a control unit and adapted to display the wavelength of each of the plurality of tunable ports.

These and other advantages of the invention will be apparent to those of ordinary skill in the art by reference to the following detailed description and the accompanying drawings.

DETAILED DESCRIPTION OF THE PREFERRED EMBODIMENTS

Figure 1:
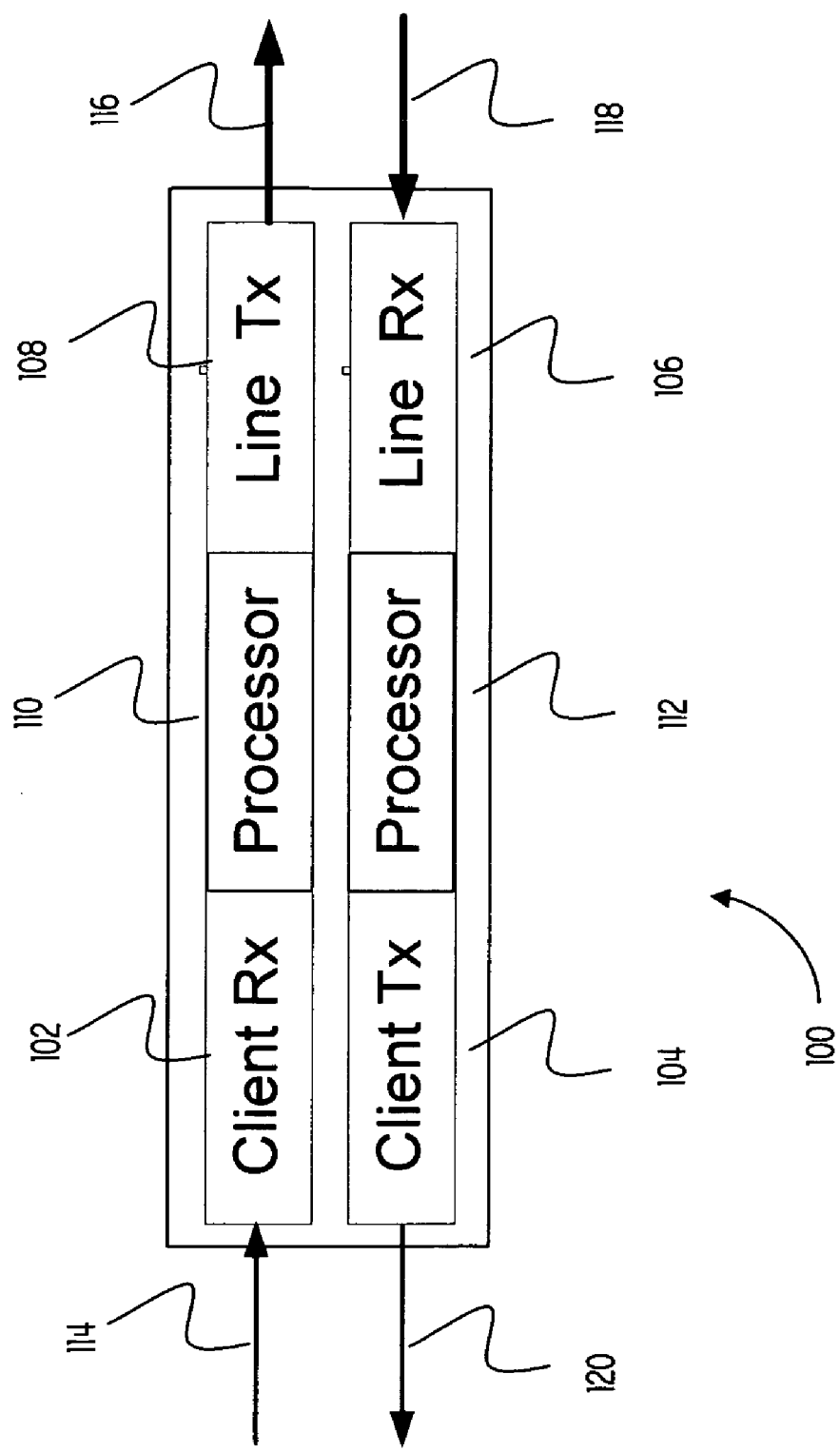
FIG. 1 is a schematic of an exemplary optical transponder utilized in WDM optical networking systems.

FIG. 1 is a schematic diagram of a typical optical transponder 100 comprising a client receiver 102, client transmitter 104, line receiver 106, line transmitter 108 and processing devices 110 and 112. An optical signal 114 from equipment on the optical network (not shown) is received by the client receiver 102, and then converted by an optical/electrical (O/E) converter to an electrical signal. The converted signal is applied to processor 110 which implements mapping/de-mapping, monitor overheads and the like. Line transmitter 108 utilizes an electrical/optical (E/O) converter to convert the processed electrical signal to an optical signal 116 at a specific wavelength. In a similar fashion, an optical signal 118 at a specific wavelength is received by line receiver 106, and then converted to an electrical signal by an O/E converter. The converted signal is applied to processor 112, and subsequently applied to client transmitter 104 which utilizes an E/O converter to convert the electrical signal to a client optical signal 120 for transmission to other equipment on the network. The wavelength of the line transmitter 108 can be specifically tuned as required during operation by utilizing tunable lasers. This type of transponder is therefore commonly referred to as a tunable transponder. Line receiver 106 is typically a broadband receiver, which is constructed and arranged to receive an optical signal at any wavelength within an allowable range. The wavelength of the incoming signal 118 to line receiver 106 is usually fixed by a wavelength sensitive demultiplexer. However, by utilizing a tunable filter or wavelength selective switch, the line receiver 106 can also be dynamically tuned to select an optical signal at a specific wavelength within the multiplexed incoming signal.

Figure 2:
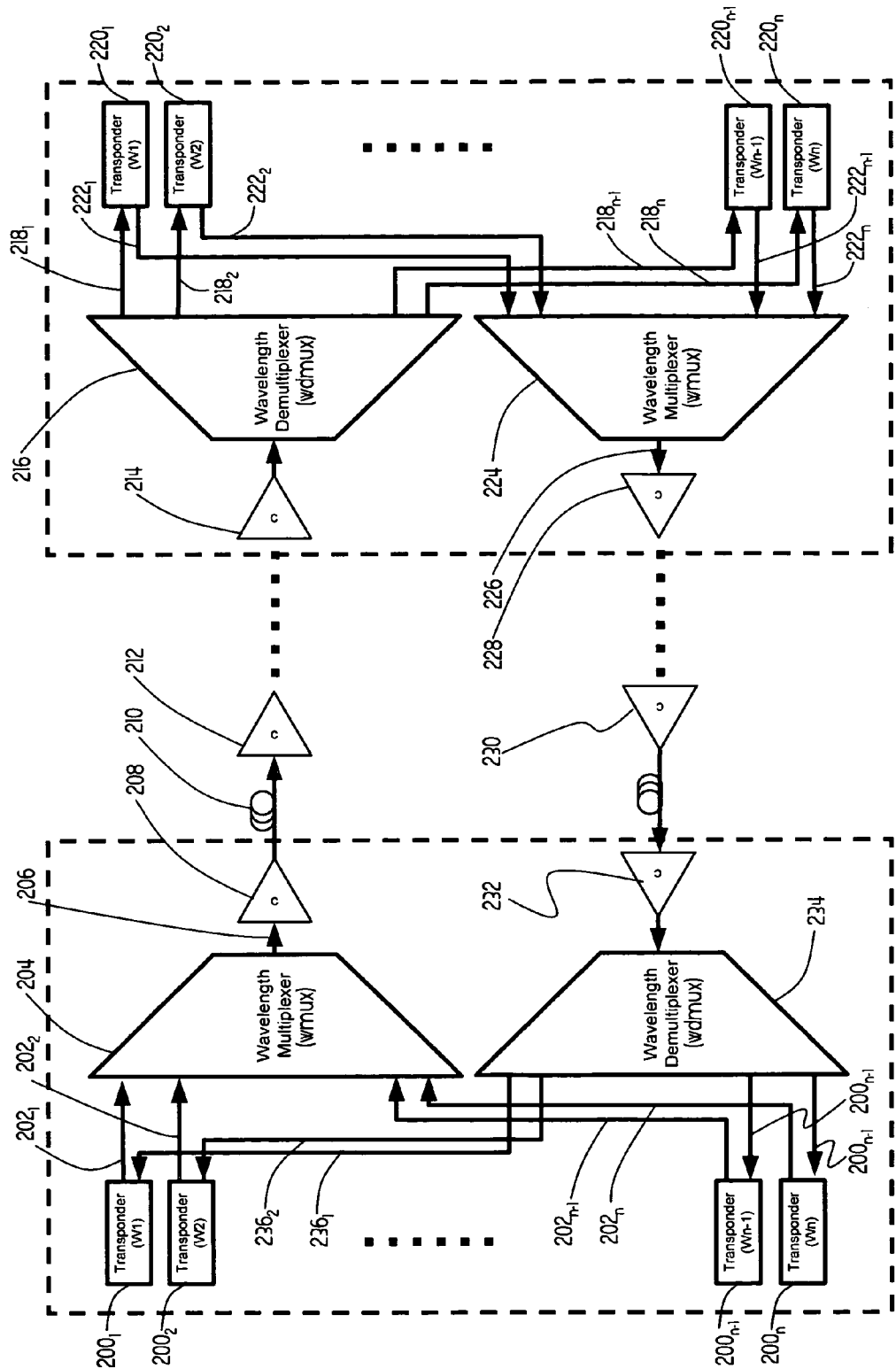
FIG. 2 is a schematic of an exemplary bi-directional point-to-point WDM optical transmission system.

Since a typical WDM system can accommodate a large amount of channels (i.e., from several to more than a hundred), each channel requires one pair of transponders that operate at a specific wavelength. Referring now to FIG. 2, there is depicted a schematic of a simplified WDM system that transmits optical signals between two sites identified as "Office A" and "Office B." In Office A, a first transponder $200_1$ outputs a line optical signal at a specific wavelength (W1) through a fiber jumper $202_1$ to a wavelength multiplexer (WMUX) 204. Similarly, a plurality of additional transponders $200_2 \ldots 200_n$ in Office A output respective optical signals over fiber jumpers $202_2 \ldots 202_n$ at unique wavelengths W1 ... Wn to the WMUX 204. The WMUX 204 then multiplexes all the line optical signals at wavelengths W1 ... Wn generated by transponders $200_1 \ldots 200_n$. The multiplexed optical signal 206 is amplified by an optical amplifier 208 and then injected into a transmission optical fiber 210. After transmission over some distance, the optical signal, which is weakened due to fiber transmission losses, is amplified by an another optical amplifier 212 and possibly additional optical amplifiers, the last of which is depicted in the receiving Office B at 214. In Office B, the multiplexed optical signal is received and then separated into a plurality of corresponding optical signals, each having its original unique wavelength via a wavelength demultiplexer (WDMUX) 216. The demultiplexed optical signal at wavelength W1 is connected via a fiber jumper $218_1$ to the receiver of transponder $220_1$. All other demultiplexed optical signals at wavelengths $W_2 \ldots W_n$ are also connected via fiber jumpers $218_2 \ldots 218_n$ to additional wavelength-specific transponders $220_2 \ldots 220_n$.

For transmissions in the opposite direction from Office B to Office A, the first transponder $220_1$ outputs a line optical signal at a specific wavelength (W1) through a fiber jumper $222_1$ to a WMUX 224. Similarly, the additional transponders $220_2 \ldots 220_n$ in Office B output respective optical signals over fiber jumpers $222_2 \ldots 222_n$ at unique wavelengths W1 ... Wn to the WMUX 224. The WMUX 224 then multiplexes all the line optical signals at wavelengths W1 ... Wn generated by transponders $220_1 \ldots 220_n$. The multiplexed optical signal 226 is amplified by an optical amplifier 228, injected into a transmission optical fiber, re-amplified by illustrative optical amplifiers 230 and 232, and received by DEMUX 234 in Office A as described in the foregoing. The demultiplexed optical signal at wavelengths W1 ... Wn is then input to the respective transponders $200_1 \ldots 200_n$ via fiber jumpers $236_1 \ldots 236_n$.

Figure 3:
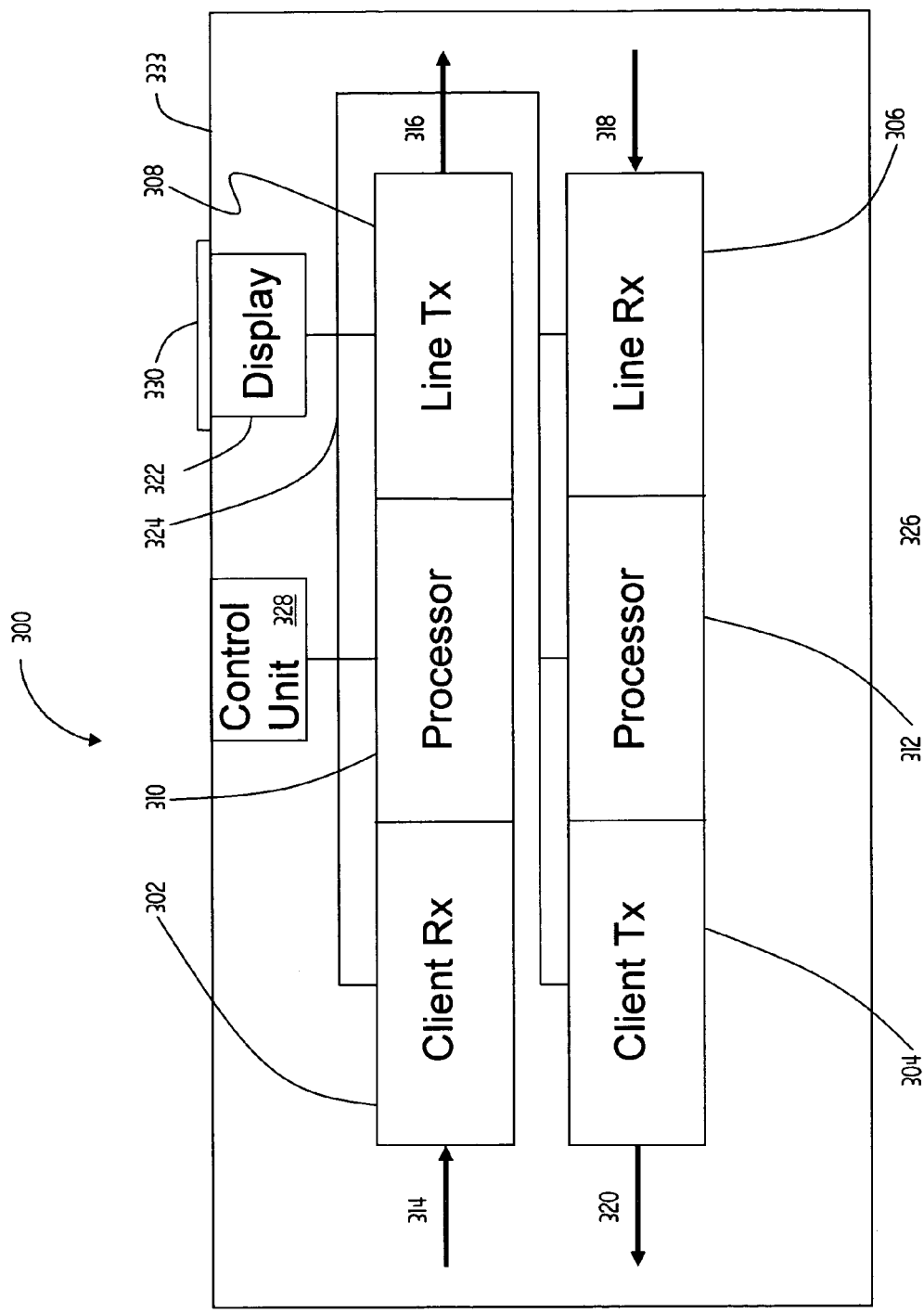
FIG. 3 is a schematic of an optical transponder in accordance with an aspect of the present invention.

Referring now to FIG. 3, there is depicted an optical transponder 300 in accordance with an aspect of the invention, which enables real time display of the tuned wavelength of the line transmitter and line receiver. The optical transponder 300 comprises a client receiver 302, client transmitter 304, line receiver 306, line transmitter 308 and processing devices 310 and 312 as described above and shown in FIG. 1. An optical signal 314 from equipment on the optical network is received by the client receiver 302, and then converted by an optical/electrical (O/E) converter to an electrical signal. The converted signal is applied to processor 310. Line transmitter 308 utilizes an electrical/optical (E/O) converter to convert the processed electrical signal to an optical signal 316 at a specific wavelength. In a similar fashion, an optical signal 318 at a specific wavelength is received by line receiver 306, and then converted to an electrical signal by an O/E converter. The converted signal is applied to processor 312, and subsequently applied to client transmitter 304 which utilizes an E/O converter to convert the electrical signal to a client optical signal 320 for transmission to other equipment on the network. The wavelength of the line transmitter 308 can be specifically tuned as required during operation by utilizing tunable lasers. Line receiver 306 is constructed and arranged to receive an optical signal at any wavelength within an allowable range. The wavelength of the incoming signal 318 to line receiver 306 can also be dynamically tuned to select an optical signal at a specific wavelength within the multiplexed incoming signal using a tunable filter or wavelength selective switch. A display device 322 is coupled to a control unit 328 which communicates with the line transmitter 308, processor 310, client transmitter 302, line receiver 306, processor 312 and client transmitter 304 via a bus 324. The control unit 328 is constructed and arranged for controlling all aspects of transponder operation as will be appreciated by those skilled in the art and may be disposed either within the housing of the 333 of the transponder 300, or at another location. The display device may be a liquid crystal display (LCD), light emitting diode (LED) or other suitable implementation for displaying the tuned wavelengths of the line receiver 306 and line transmitter 308. The display device 322 can be mounted on a faceplate 330 on the housing 333 of the transponder 300. The display device 322 can be constructed and arranged to display wavelength, frequency, channel number, or any other identification number corresponding to the tuned operating wavelength of the line transmitter or receiver. The display device 322 may be provided with selectable modes to alternatively display the wavelengths for the line transmitter 308 and line receiver 306.

Figure 4:
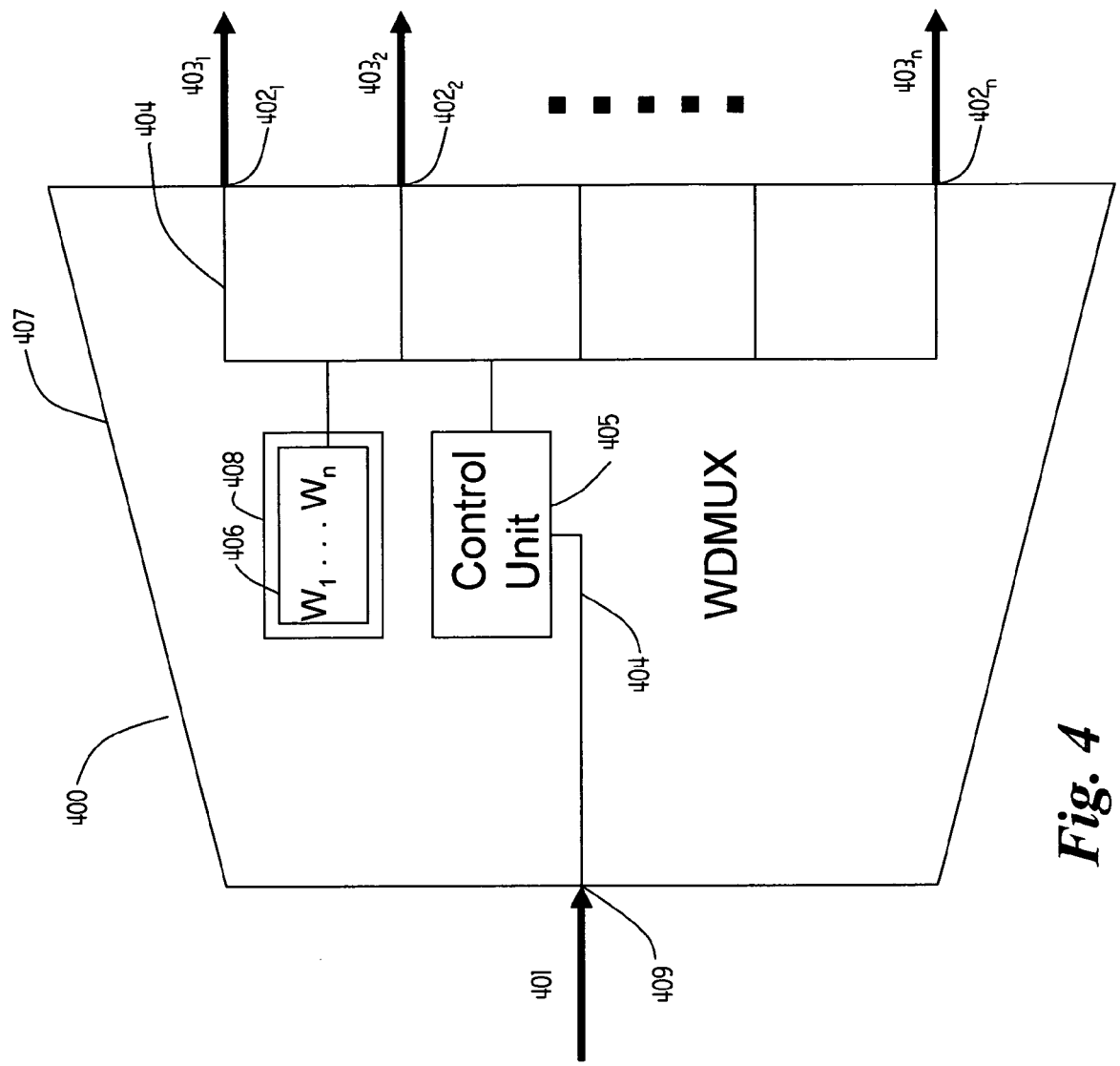
FIG. 4 is a schematic of a wavelength division demultiplexer in accordance with an aspect of the present invention.

In accordance with another aspect of the invention, FIG. 4 depicts a WDMUX 400 having an input port 409 coupled to an input multiplexed optical signal 401 and comprising a plurality of tunable ports $402_1, 402_2, \ldots 402_n$ for outputting individual optical signals $403_1, 403_2, \ldots 403_n$ on specified wavelengths. As shown in the drawing, the arrows corresponding to signals 401 and 403 represent optical signals. Each tunable port $402_1, 402_2, \ldots 402_n$ communicates via a bus 404 with a control unit 405 as is known in the art. The bus 404 represents an electrical connection between the control unit 405, the individual tunable ports $402_1, 402_2, \ldots 402_n$ and input port 409. The control unit 405 may be disposed within the WDMUX housing 407, or externally at another location. A display device 406 is operably coupled to the control unit 405 via bus 404 to display the frequencies of tunable ports $402_1, 402_2, \ldots 402_n$, and may comprise an LCD, LED or equivalent device as described above. The display device 406 may be mounted on the WDMUX housing 407 on a faceplate 408 to enable easy identification by personnel. The display device 406 may be provided with selectable modes to display the individual wavelengths respectively selected for each tunable port $402_1, 402_2, \ldots 402_n$.

Figure 5:
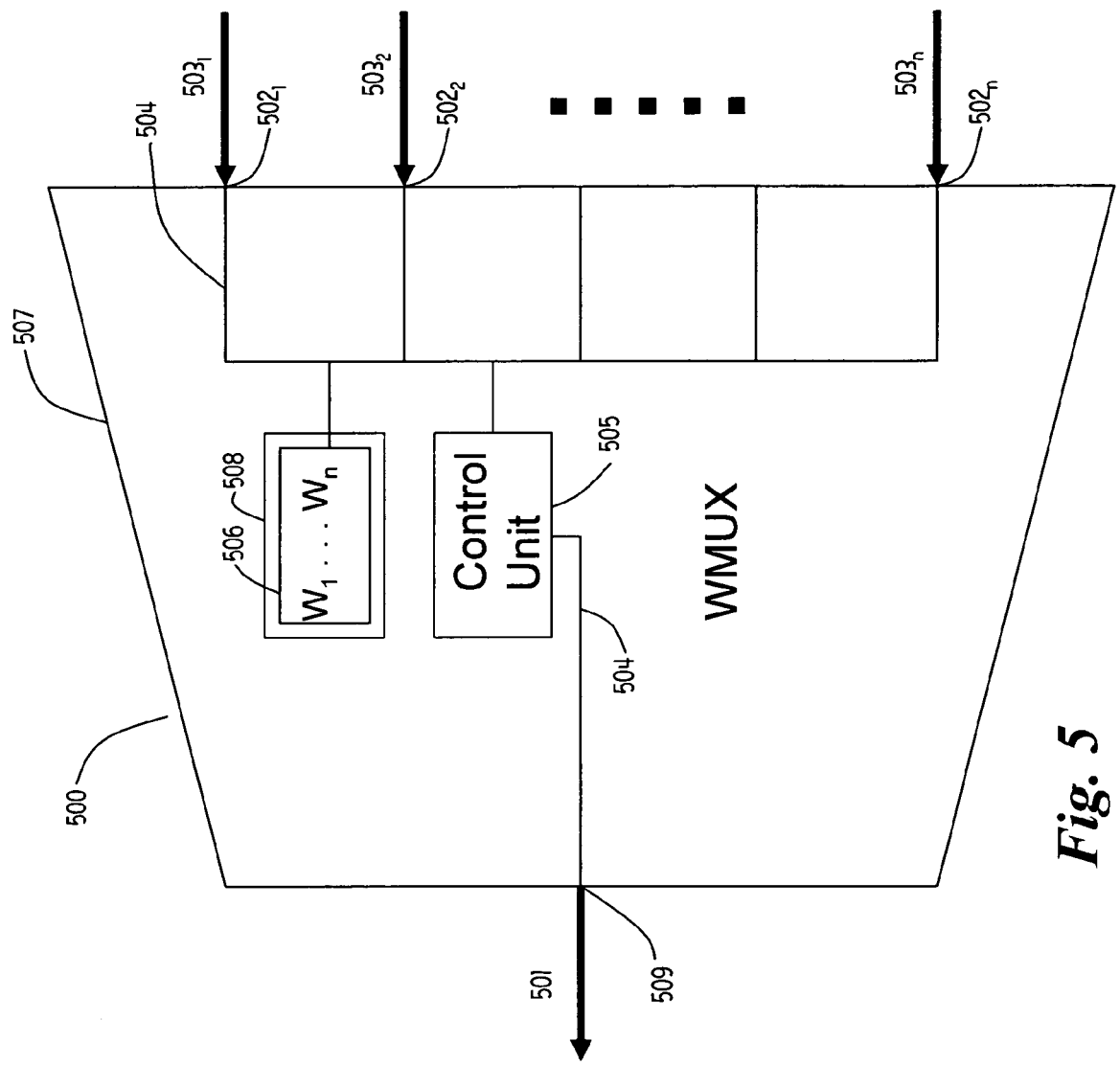
FIG. 5 is a schematic of a wavelength division multiplexer in accordance with an aspect of the present invention.

FIG. 5 depicts a WMUX 500 comprising a plurality of tunable ports $502_1, 502_2, \ldots 502_n$ for receiving individual optical signals $503_1, 503_2, \ldots 503_n$ on specified wavelengths and outputting a multiplexed optical signal 501 through output port 509. Each tunable port $502_1$, $502_2$, ... $502_n$ electrically communicates via a bus 504 with a control unit 505 in a manner similar to that described above with respect to WDMUX 400. The control unit 405 may be disposed within the WMUX housing 507, or externally at another location. A display device 506 is operably coupled to the control unit 505 to display the frequencies of tunable ports $502_1$, $502_2$, ... $502_n$, and may comprise an LCD, LED or equivalent device as described above. The display devices 506 may be mounted on the WMUX housing 507 of the WMUX 500 on a faceplate 508 in a manner similar to the embodiment described above and illustrated in FIG. 4.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

I claim:

1. A wavelength division demultiplexer for use in a wavelength division multiplexing (WDM) system, comprising:
    an input port for receiving a multiplexed optical signal and a plurality of tunable output ports for outputting demultiplexed optical signals at specific wavelengths; and
    a display device for displaying the wavelengths corresponding to each of the plurality of tunable output ports, the display device being electrically coupled to a control unit in the wavelength division demultiplexer so as to display the wavelengths in real time.

2. The wavelength division demultiplexer recited in claim 1, wherein the display device is disposed on a housing of the wavelength division demultiplexer.

3. A wavelength division multiplexer for use in a wavelength division multiplexing (WDM) system, comprising:
    a plurality of tunable input ports for receiving optical signals at specific wavelengths, and an output port for outputting a multiplexed optical signal; and
    a display device for displaying the wavelengths corresponding to each of the plurality of tunable input ports, the display device being electrically coupled to a control unit in the wavelength division multiplexer so as to display the wavelengths in real time.

4. The wavelength division multiplexer recited in claim 3, wherein the display device is disposed on a housing of the wavelength division multiplexer.

* * * * *